(12) United States Patent
Vissenberg et al.

(10) Patent No.: US 9,411,181 B2
(45) Date of Patent: Aug. 9, 2016

(54) DISPLAY DEVICE

(75) Inventors: Michel Cornelis Josephus Marie Vissenberg, Eindhoven (NL); Willem Lubertus Ijzerman, Eindhoven (NL); Gabriela Binasch, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 1448 days.

(21) Appl. No.: 12/067,304

(22) PCT Filed: Sep. 13, 2006

(86) PCT No.: PCT/IB2006/053251
§ 371 (c)(1),
(2), (4) Date: Mar. 19, 2008

(87) PCT Pub. No.: WO2007/034370
PCT Pub. Date: Mar. 29, 2007

(65) Prior Publication Data
US 2008/0258995 A1    Oct. 23, 2008

(30) Foreign Application Priority Data

Sep. 21, 2005   (EP) .................................. 05108700

(51) Int. Cl.
| | | |
|---|---|---|
| *G09G 5/00* | (2006.01) | |
| *G02F 1/13* | (2006.01) | |
| *B60K 35/00* | (2006.01) | |
| *G02F 1/1335* | (2006.01) | |
| *B60R 11/00* | (2006.01) | |
| *F21V 8/00* | (2006.01) | |
| *G02F 1/1333* | (2006.01) | |

(52) U.S. Cl.
CPC .............. *G02F 1/1323* (2013.01); *B60K 35/00* (2013.01); *G02F 1/133615* (2013.01); *B60K 2350/901* (2013.01); *B60K 2350/903* (2013.01); *B60R 2011/0005* (2013.01); *G02B 6/0043* (2013.01); *G02B 6/0051* (2013.01); *G02F 2001/133391* (2013.01)

(58) Field of Classification Search
CPC ........ G06F 19/22; G06F 19/345; G06F 1/163
USPC ............... 345/1, 102, 7, 9; 349/64, 66, 62, 65
See application file for complete search history.

(56) References Cited

U.S. PATENT DOCUMENTS

| | | | | |
|---|---|---|---|---|
| 5,371,510 A | * | 12/1994 | Miyauchi et al. .................. | 345/7 |
| 5,897,184 A | * | 4/1999 | Eichenlaub et al. ............ | 349/64 |
| 6,231,201 B1 | | 5/2001 | Rupp | |
| 6,337,721 B1 | | 1/2002 | Hamagishi et al. | |

(Continued)

FOREIGN PATENT DOCUMENTS

| | | |
|---|---|---|
| EP | 0896897 A2 | 2/1999 |
| GB | 2404991 A | 2/2005 |

(Continued)

*Primary Examiner* — Olga Merkoulova
(74) *Attorney, Agent, or Firm* — Larry Liberchuk

(57) ABSTRACT

The present invention relates to a dual view display device where a display surface is divided into a first and a second sub-section (10a, 10b). A backlighting arrangement is used which provides light with different angular distributions (16a, 16b; 16a', 16b') to the different sub-sections. This allows at low cost e.g. in a vehicle the displaying of movies or computer game windows at a part of a display, which part is not visible for the driver of the vehicle.

9 Claims, 3 Drawing Sheets

(56) References Cited

U.S. PATENT DOCUMENTS

| | | |
|---|---|---|
| 6,697,201 B2 | 2/2004 | Watanabe |
| 6,724,450 B1 | 4/2004 | Knoll et al. |
| 7,511,683 B2 * | 3/2009 | Sumiyoshi ........................ 345/7 |
| 2003/0007227 A1 * | 1/2003 | Ogino ........................... 359/227 |
| 2004/0240777 A1 | 12/2004 | Woodgate et al. |

FOREIGN PATENT DOCUMENTS

| | | |
|---|---|---|
| JP | 2002099223 A | 4/2002 |
| JP | 2002228466 A | 8/2002 |
| JP | 2005024737 A | 1/2005 |
| JP | 2005257756 A | 9/2005 |
| WO | 2004088996 A1 | 10/2004 |

\* cited by examiner

DISPLAY DEVICE

FIELD OF THE INVENTION

The present invention relates to a display device, being capable of displaying different content in different viewing angles and comprising an LCD panel and a backlighting arrangement.

BACKGROUND OF THE INVENTION

Such a device is disclosed e.g. in WO, 2004/088996, A1. This device is intended to be used as an autostereoscopic 3D display and comprises an LCD panel and a switchable backlighting arrangement, which is capable of providing backlight with two different angular distributions, one being suitable for displaying content to the right eye of a user, and another being suitable for displaying to the user's left eye. The backlight is switched between the two states, and at the same time the LCD panel is switched between showing right eye and left eye content.

A disadvantage with such a display is the high speed requirements imposed on the LCD panel in order to achieve flicker-free displaying of information. These requirements result in a complex and expensive display.

SUMMARY OF THE INVENTION

An object of the present invention is therefore to provide a less complex and thus less expensive solution.

This object is achieved by means of display device as defined in claim 1. More specifically, the device then comprises an LCD panel and a backlighting arrangement, wherein a first subsection of the LCD panel is arranged to display a first image and a second subsection of the LCD panel is arranged to display a second image, and the backlighting arrangement, at said first subsection, is arranged to emit light with a first angular distribution, and, at the second subsection, is arranged to emit light with a second angular distribution which is different from the first angular distribution. This means that the content displayed on the LCD panel need not be rapidly switched between information intended to be displayed e.g. to the left and to the right. LCD panel requirement can therefore be kept low as can the display device cost.

In a preferred embodiment, the backlighting arrangement comprises a lightguide, arranged to selectively emit light with the first or second angular distribution, a first controllable shutter, covering the first LCD panel sub-section and a second controllable shutter, covering the second LCD panel sub-section, and is arranged to emit, in a first mode, light with the first angular distribution while making the first shutter transmissive and the second shutter blocking, and, in a second mode, light with the second angular distribution while making the first shutter blocking and the second shutter transmissive. This is one low-cost implementation of the inventive idea. The shutters may have coarse pixels, and need only switch between being fully blocking and fully transmitting, and may therefore be accomplished at low cost.

The first angular distribution may be emitted by activating a first lamp and light with the second angular distribution may be emitted by activating a second lamp.

The backlighting arrangement may also emit, in a third mode, light with both angular distributions simultaneously, while making both shutters transmissive. The display may then also be operated without a dual view function, i.e. without displaying different content in different directions.

The backlighting arrangement may also be arranged to selectively emit light with a third angular distribution. This allows e.g. in a vehicle the adaptation of the display to different seating positions of a passenger.

In an alternative embodiment, the backlighting arrangement may comprise a lightguide, arranged to emit light with the second angular distribution, and a first diffuser, which covers the first LCD panel sub-section and changes the angular distribution at that sub-section into the first angular distribution. A diffuser performing this function may also be accomplished at low cost, and may also be controllable.

In the alternative embodiment, the backlighting arrangement may also comprise a second controllable diffuser, covering the second LCD panel sub-section.

The LCD panel may have the format 16:9 and the second sub-section the format 4:3, such that the division between the first and second sub-sections is accomplished by a vertical border.

Alternatively, the LCD panel may have the format 4:3, and the second sub-section the format 16:9, such that the division between the first and second sub-sections is accomplished by a horizontal border.

The display device may be mounted in a vehicle, the first image being intended for the vehicle driver, and the second image being intended for a vehicle passenger.

These and other aspects of the invention will be apparent from and elucidated with reference to the embodiments described hereinafter.

DESCRIPTION OF PREFERRED EMBODIMENTS

Figure 1:
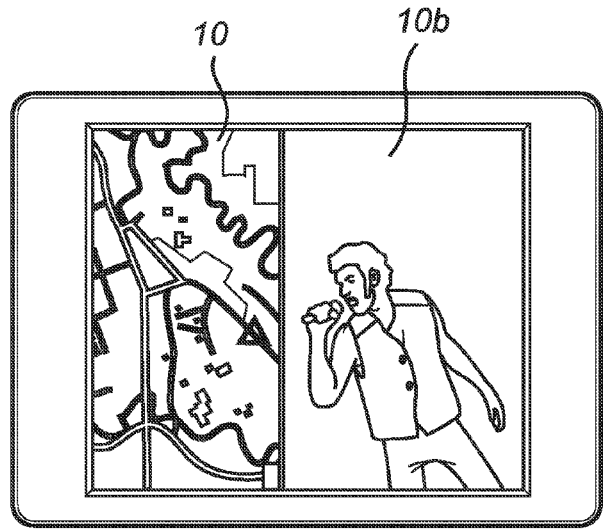
FIG. 1 is a front view of a display device according to an embodiment of the invention.

FIG. 1 is a front view of a display device according to an embodiment of the invention. This display device may be intended to be mounted on a vehicle dashboard. The display device provides navigation information, such as a navigation system map, a vehicle user interface, or any other driving related visual information to the driver. At the same time the display device provides other information to the passengers of the vehicle, such as movie, an internet browser window or a computer game view. The passenger information should not be visible to the driver when driving the vehicle for safety reasons. The passengers may view the passenger information only, or both the passenger information and the driver information.

In prior art devices this has been addressed by providing a display device that displays the driver information in one viewing angle over the entire surface of the display, while displaying the passenger information over the entire surface of the display in another in another viewing angle. These dual view display have to a great extent been achieved by using elongated vertical barriers or a lenticular array, much in the same way as in autostereoscopic (3D) displays.

In this embodiment of the invention however, the display device is divided into a first part 10a, intended for the display of driver information, and a second part 10b, intended for the display of passenger information. This arrangement provides advantages, particularly in relation to cost aspects, as will be further discussed below.

Figure 2A:
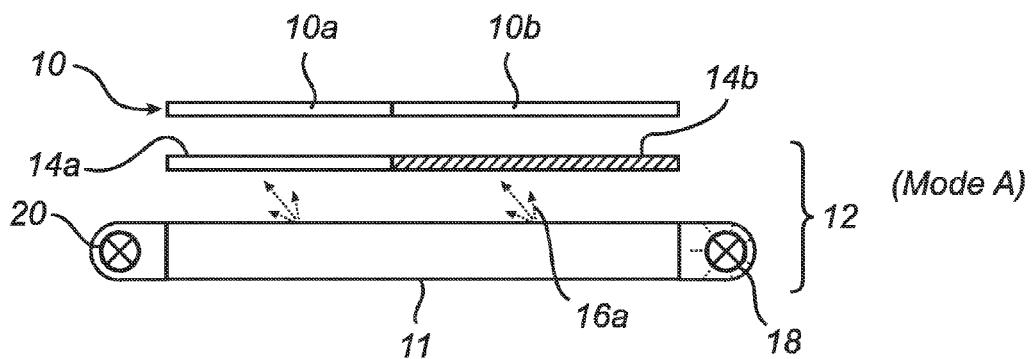
FIGS. 2a-2c illustrate schematically a cross section through a display device according to a first embodiment of the invention in three different display modes.
Figure 2B:
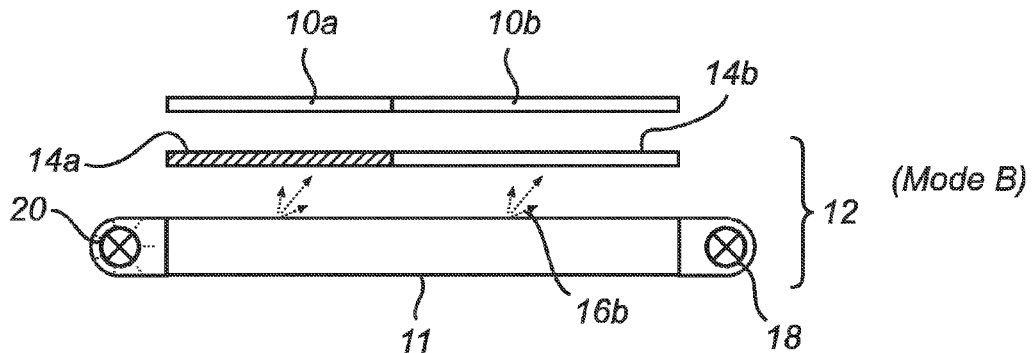
Figure 2C:
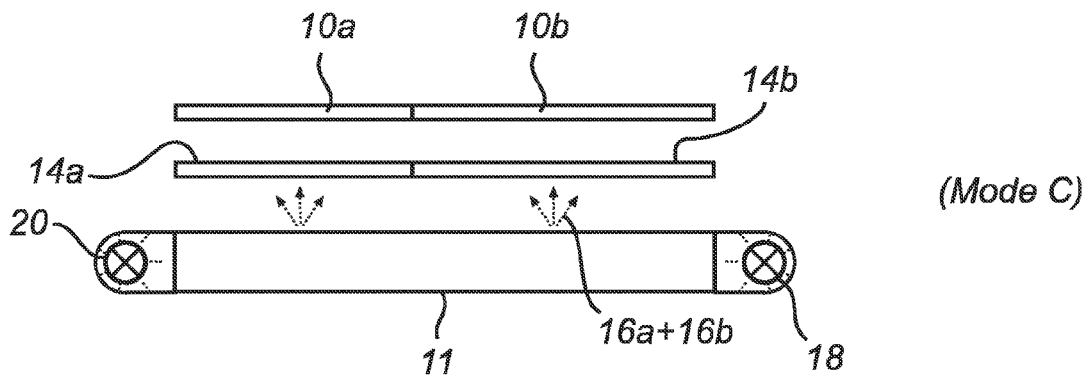

FIGS. 2a-2c illustrate schematically a cross section through a display device according to a first embodiment of the invention in three different display modes. This cross section could be taken as seen from the bottom of FIG. 1.

Briefly, the display device comprises a transmissive LCD panel 10 and a backlighting arrangement 12.

The LCD panel 10 comprises a number of sub-layers such as polarizers, etc., as is well known in the art. As mentioned above, first and second sections 10a, 10b are arranged to display driver and passenger information, respectively.

The backlighting arrangement 12 comprises a lightguide 11, which is capable of selectively emitting light with a first or a second angular distribution.

FIG. 2a illustrates the display device in a first mode (Mode A). The lightguide may be devised similar to what is disclosed in WO, 2004/088996, A1. Then, when the lightguide 11 in Mode A is illuminated with light from a first light source 18 as illustrated in FIG. 2a, the lightguide emits light with a first angular distribution 16a. The light source 18 may comprise e.g. one or more cold cathode fluorescent lamps or light emitting diodes (LEDs).

The backlighting arrangement 12 further comprises a first controllable shutter 14a, covering the first LCD panel sub-section 10a and a second controllable shutter 14b, covering the second LCD panel sub-section 10b. The shutters 14a, 14b may be devised as liquid crystal shutters, which are per se well known. In Mode A the first shutter 14a is made transmissive while the second shutter 14b is blocking. Thus the first LCD panel sub-section 10a is illuminated with light having the first angular distribution 16a, which may be suitable for viewing the image from a first angular position in relation to the display device, e.g. at the position of the driver.

FIG. 2b illustrates the display device in a second mode (Mode B). In this mode the lightguide 11 is instead illuminated by a second light source 20, having a position in relation to the light guide that is different from the position of the first light source 18. This results in the lightguide emitting light with a second angular distribution 16b, that is different from the first angular distribution 16a.

At the same time, the first shutter 14a is made blocking and the second shutter 14b is made transmissive. Therefore, the second image sub-section is illuminated with light having the second angular distribution 16b, which may be suitable for viewing the image from a second angular position in relation to the display device, e.g. at the position of a passenger.

The display device may rapidly alternate between Mode A and Mode B, thus displaying the content of sub-section 10a in one direction and the content of sub-section 10b in another. This can be done without quickly changing the actual content displayed on the LCD panel sub-sections 10a, 10b, which means that the required LCD panel performance can be kept low, resulting in a comparatively inexpensive display device. The shutters must of course allow fast switching, but since these elements are only switched between blocking and fully transmitting, and since they may have quite coarse pixels, they are relatively inexpensive.

When the vehicle has stopped and the driver does not need to concentrate on the traffic environment, it may be suitable to drive the display panel in a third mode (Mode C), as illustrated in FIG. 2c. In this mode, both the first and the second shutter 14a, 14b are made transmissive and both the first and the second light source illuminate the lightguide 11. The lightguide therefore emits light with both angular distributions simultaneously, i.e. the sum of the two distributions. Both the driver and the passenger may thus view the entire display area. The two sub-sections may still display different contents, but it is also possible to display one image over the entire display. The light source power or the LCD panel luminance may be adjusted to compensate for increased average light flow through the shutters. The third mode illustrated in FIG. 2c may also be used when driving the vehicle, as long as driver related information is displayed over the entire display area.

Note in connection with the embodiment described above that the lightguide 11 and the light sources 18, 20 may be replaced with another arrangement, capable of selectively emitting light with a first or a second angular distribution. Note also that the first shutter 14a can in principle be omitted, thus allowing the passenger to see also the content of the first sub-section.

In the embodiment disclosed in connection with FIGS. 2a-2c a further light source or set of light sources, apart from 18 and 20, may be applied, that have a third positional relationship vis-à-vis the lightguide 11. This allows light with a third angular distribution to be emitted by the backlighting arrangement, which can be useful in terms of flexibility. The emission of light can then be adjusted depending e.g. on where in a vehicle the passengers are placed.

Figure 3A:
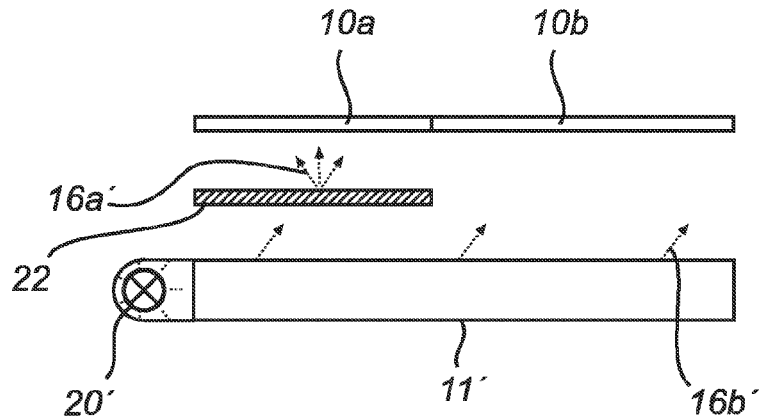
FIGS. 3a-3b illustrate schematically a cross section through a display device according to a second embodiment of the invention in two different display modes.
Figure 3B:
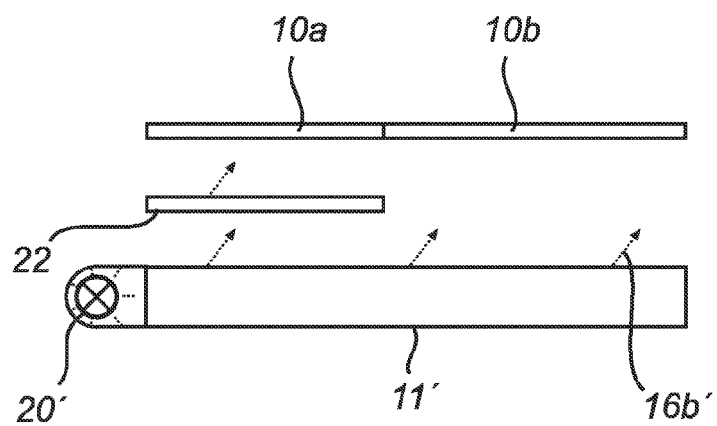

FIGS. 3a-3b illustrate schematically a similar cross section through a display device according to a second embodiment of the invention in two different display modes. In this embodiment a light guide 11' is constantly illuminated by at least one light source 20'. The light guide 11' in turn therefore emits light with a constant angular distribution 16b', which may be suitable for displaying an image in a direction towards a passenger. At the second sub-section 10b of the LCD panel, the display device therefore displays an image that is visible only from a position having a particular angular relationship vis-à-vis the display device. At the first LCD panel sub-section however, a diffuser 22 alters the angular distribution of the light into a another distribution 16a', such that the first LCD panel sub-section 10a displays an image that can be viewed in a broader angular range than the second sub-section 10b. Information displayed on this part of the display area can therefore be viewed also e.g. by the driver.

As illustrated in FIG. 3b, the diffuser may be switchable, such that the diffusing property may be reduced or eliminated. Thus not allowing e.g. the driver to see the displayed image at all. It is of course also possible to apply a controllable diffuser (not shown) also at the second sub-section.

Figure 4:
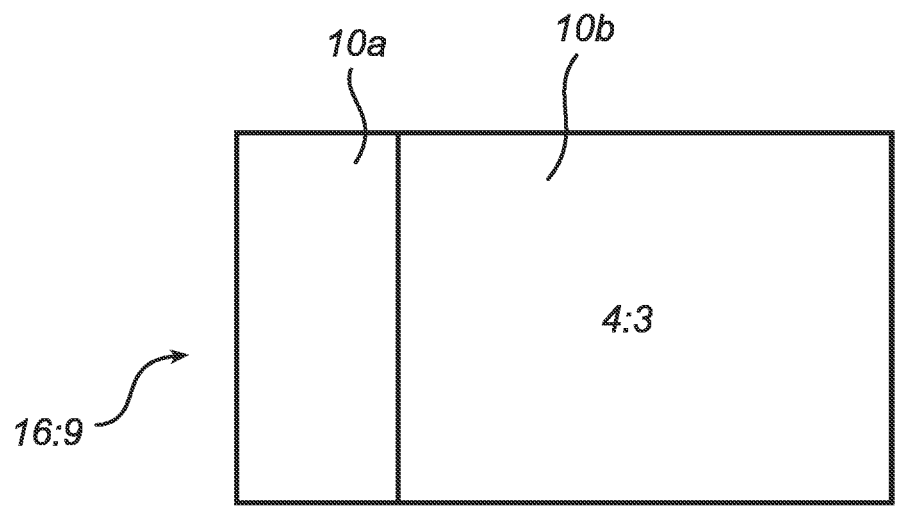
FIG. 4 illustrates a first approach for sectioning a display device in a vehicle application.

FIG. 4 illustrates a first approach for sectioning a display device in a vehicle application. In this case a display with the standard widescreen format 16:9 (width: height) is used. The second sub-section 10b, which is intended for passenger use, is accomplished as a 4:3 area at one side of the display by applying a vertical border. The remainder of the display, at the other side of the border, is used as the first sub-section 10a, intended for displaying driver information.

Figure 5:
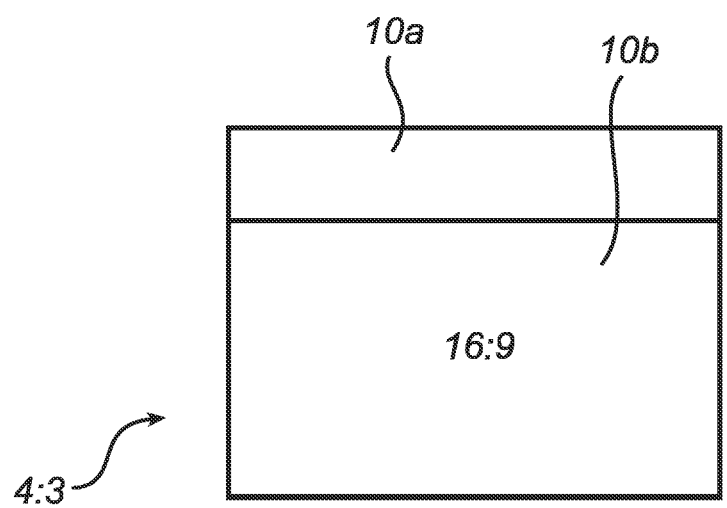
FIG. 5 illustrates a second approach for sectioning a display device in a vehicle application.

FIG. 5 illustrates a second approach for sectioning a display device in a vehicle application. In this case a display with the standard format 4:3 is used. The second sub-section 10b, which is intended for passenger use, is accomplished as a 16:9 area at the top or bottom of the display by applying an horizontal border. The remainder of the display, at the other side of the border, is used as the first sub-section 10a, intended for displaying driver information. Thus, the sectioning schemes illustrated in FIG. 4 and FIG. 5 allow the passenger to watch video in a standard 4:3 or 16:9 format.

In summary, the invention relates to a dual view display device where a display surface is divided into a first and a second sub-section. A backlighting arrangement is used which provides light with different angular distributions to the different sub-sections. This allows at low cost e.g. in a vehicle the displaying of movies or computer game windows at a part of a display, which part is not visible for the driver of the vehicle.

The invention is not restricted to the described embodiments. It can be altered in different ways within the scope of the appended claims.

The invention claimed is:

1. A display device for displaying different content in different viewing angles, comprising:
   an LCD panel and a backlighting arrangement, wherein a first subsection of the LCD panel is arranged to display a first image and a second subsection of the LCD panel is arranged to display a second image, and the backlighting arrangement, at said first subsection, is arranged to emit light with a first angular distribution and at the second subsection is arranged to emit light with a second angular distribution which is different from the first angular distribution;
   wherein the backlighting arrangement further comprises a lightguide, arranged to selectively emit light with the first or second angular distribution by selectively turning on or off a first light source and a second light source, the first light source being located at a first location and the second light source being located at a second location different from the first location so that the second angular distribution is different from the first angular distribution, a first controllable shutter, covering the first LCD panel sub-section and a second controllable shutter, covering the second LCD panel sub-section, and is arranged to emit, in a first mode, light with the first angular distribution while making the first shutter transmissive and the second shutter blocking, and, in a second mode, light with the second angular distribution while making the first shutter blocking and the second shutter transmissive.

2. A display device according to claim 1, wherein the backlighting arrangement is arranged to emit, in a third mode, light with both angular distributions simultaneously, while making both shutters transmissive.

3. A display device according to claim 1, wherein the backlighting arrangement is arranged to selectively emit light with a third angular distribution.

4. A display device according to claim 1, wherein the backlighting arrangement comprises a lightguide arranged to emit light with the second angular distribution and comprises a first diffuser covering the first LCD panel sub-section and changing the angular distribution at that sub-section into the first angular distribution.

5. A display device according to claim 4, wherein the first diffuser is controllable.

6. A display device according to claim 5, wherein the backlighting arrangement comprises a second controllable diffuser, covering the second LCD panel sub-section.

7. A display device according to claim 1, wherein the LCD panel has the format 16:9 and the second sub-section has the format 4:3, such that the division between the first and second sub-sections is accomplished by a vertical border.

8. A display device according to claim 1, wherein the LCD panel has the format 4:3 and the second sub-section has the format 16:9, such that the division between the first and second sub-sections is accomplished by a horizontal border.

9. A display device according to claim 1, wherein the display device is mounted in a vehicle, the first image is intended for the vehicle driver, and the second image is intended for a vehicle passenger.

* * * * *